US012645376B2

(12) United States Patent
Swami et al.

(10) Patent No.: US 12,645,376 B2
(45) Date of Patent: Jun. 2, 2026

(54) VOLATILE MEMORY TO NON-VOLATILE MEMORY INTERFACE FOR POWER MANAGEMENT

(71) Applicant: Micron Technology, Inc., Boise, ID (US)

(72) Inventors: Shivam Swami, Folsom, CA (US); Kenneth Marion Curewitz, Cameron Park, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/619,046

(22) Filed: Mar. 27, 2024

(65) Prior Publication Data

US 2024/0248620 A1     Jul. 25, 2024

Related U.S. Application Data

(63) Continuation of application No. 17/975,364, filed on Oct. 27, 2022, now Pat. No. 11,960,738, which is a (Continued)

(51) Int. Cl.
*G06F 12/00* (2006.01)
*G06F 3/06* (2006.01)
*G06F 12/0804* (2016.01)

(52) U.S. Cl.
CPC .......... *G06F 3/0625* (2013.01); *G06F 3/0634* (2013.01); *G06F 3/068* (2013.01);
(Continued)

(58) Field of Classification Search
CPC ...... G06F 3/0625; G06F 3/0634; G06F 3/068; G06F 12/0804; G06F 2212/1028;
(Continued)

(56) References Cited

U.S. PATENT DOCUMENTS 5,404,543 A * 4/1995 Faucher ................ G06F 1/3275
713/323
5,701,438 A * 12/1997 Bains .................. G06F 12/0684
711/E12.089

(Continued)

OTHER PUBLICATIONS

International Search Report and Written Opinion, PCT/US2021/046727, mailed on Dec. 10, 2021.

*Primary Examiner* — Shawn X Gu
*Assistant Examiner* — Mohammad S Hasan
(74) *Attorney, Agent, or Firm* — Greenberg Traurig

(57) ABSTRACT

Systems, methods, and apparatus related to a memory system that manages an interface for a volatile memory device and a non-volatile memory device to control memory system power. In one approach, a controller evaluates a demand on memory performance. If the demand of a current computation task needed by the host is high, a DRAM device is powered-up to meet the demand. Otherwise, if the non-volatile memory device is adequate to meet the demand, the DRAM memory is partially or fully-powered down to save power. In another approach, a task performed for a host device uses one or more resources of a first memory device (e.g., DRAM). A performance capability of a second memory device (e.g., NVRAM) is determined. A controller of the memory system determines whether the performance capability of the second memory device is adequate to service the task. In response to determining that the performance capability is adequate, the controller changes a mode of operation of the memory system so that one or more resources of the second memory device are used to service the task.

22 Claims, 6 Drawing Sheets

Related U.S. Application Data continuation of application No. 17/013,415, filed on Sep. 4, 2020, now Pat. No. 11,500,555.

(52) U.S. Cl.
CPC .. *G06F 12/0804* (2013.01); *G06F 2212/1028* (2013.01); *G06F 2212/205* (2013.01); *G06F 2212/603* (2013.01)

(58) Field of Classification Search
CPC ......... G06F 2212/205; G06F 2212/603; G06F 12/0846; G06F 12/0888; G06F 2212/1016; G06F 2212/1032; G06F 2212/214; G06F 2212/502; G06F 12/0868; G06F 3/0679; G06N 20/00; Y02D 10/00
See application file for complete search history.

(56) References Cited

U.S. PATENT DOCUMENTS

| | | | |
|---|---|---|---|
| 7,882,319 B2 | 2/2011 | Johnson et al. | |
| 8,661,186 B2* | 2/2014 | Maeda | G06F 3/0605 |
| | | | 710/60 |
| 10,042,754 B2* | 8/2018 | Moon | G06F 12/0246 |
| 10,613,755 B1* | 4/2020 | Sela | G06F 3/061 |
| 10,762,435 B2* | 9/2020 | Yang | H04L 47/125 |
| 11,500,555 B2 | 11/2022 | Swami et al. | |
| 11,960,738 B2 | 4/2024 | Swami et al. | |
| 2003/0028733 A1 | 2/2003 | Tsunoda et al. | |
| 2003/0135794 A1 | 7/2003 | Longwell et al. | |
| 2006/0174156 A1* | 8/2006 | Balasubramanian | |
| | | | G06F 11/1666 |
| | | | 711/E12.019 |
| 2009/0172263 A1 | 7/2009 | Olbrich et al. | |
| 2010/0005226 A1* | 1/2010 | Maeda | G06F 3/061 |
| | | | 711/E12.001 |
| 2011/0138387 A1 | 6/2011 | Ahn et al. | |

| | | | |
|---|---|---|---|
| 2011/0320436 A1* | 12/2011 | Hokanson | G06F 3/0685 |
| | | | 707/719 |
| 2013/0097433 A1* | 4/2013 | Boorman | G06F 1/3225 |
| | | | 711/E12.091 |
| 2014/0089699 A1 | 3/2014 | O'connor et al. | |
| 2015/0169224 A1* | 6/2015 | Alexander | G06F 21/79 |
| | | | 711/162 |
| 2016/0034310 A1* | 2/2016 | Garg | G06F 9/5088 |
| | | | 718/104 |
| 2016/0035402 A1* | 2/2016 | Antonyan | G11C 13/0026 |
| | | | 365/158 |
| 2016/0239065 A1* | 8/2016 | Lee | G06F 1/3296 |
| 2016/0320826 A1 | 11/2016 | Taha et al. | |
| 2016/0350237 A1* | 12/2016 | Anantaraman | G06F 12/0868 |
| 2017/0123920 A1* | 5/2017 | Dhuse | H04L 67/1097 |
| 2017/0162235 A1 | 6/2017 | De et al. | |
| 2017/0195126 A1* | 7/2017 | Brooks | H04B 10/69 |
| 2018/0067682 A1* | 3/2018 | Sofia | G06F 9/5016 |
| 2018/0121362 A1* | 5/2018 | Garg | G06F 3/067 |
| 2018/0157305 A1* | 6/2018 | Maisuria | G06F 1/3287 |
| 2018/0210655 A1 | 7/2018 | Pratt | |
| 2018/0267806 A1* | 9/2018 | Chirayath Kuttan | |
| | | | G06F 9/4843 |
| 2019/0107846 A1* | 4/2019 | Roy | G08G 5/80 |
| 2019/0235859 A1* | 8/2019 | Hsu | G06F 8/658 |
| 2019/0243570 A1 | 8/2019 | Mittal et al. | |
| 2019/0243771 A1* | 8/2019 | Mittal | G06F 3/0685 |
| 2019/0332525 A1* | 10/2019 | Anghel | G06N 3/08 |
| 2019/0372388 A1* | 12/2019 | Suman | H02J 3/00 |
| 2020/0005873 A1 | 1/2020 | Yazovitsky et al. | |
| 2020/0136369 A1* | 4/2020 | Chauhan | H01L 23/49541 |
| 2020/0201761 A1 | 6/2020 | Kowles | |
| 2020/0233596 A1 | 7/2020 | Lee | |
| 2020/0257530 A1 | 8/2020 | Lee et al. | |
| 2020/0348884 A1 | 11/2020 | Boenapalli et al. | |
| 2020/0371703 A1 | 11/2020 | Su | |
| 2021/0072906 A1 | 3/2021 | Kallam et al. | |
| 2021/0117117 A1 | 4/2021 | Mahesh | |
| 2022/0075536 A1 | 3/2022 | Swami et al. | |
| 2023/0046808 A1 | 2/2023 | Swami et al. | |

* cited by examiner

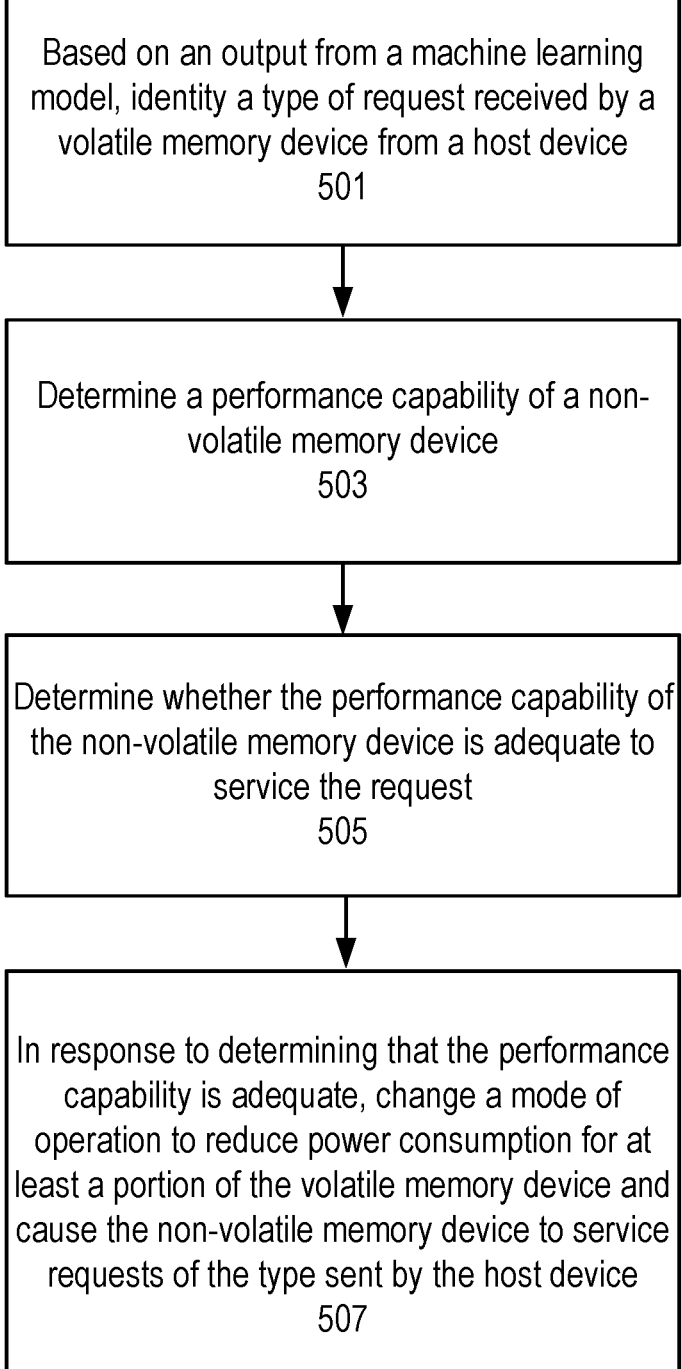

Based on an output from a machine learning model, identity a type of request received by a volatile memory device from a host device
501

Determine a performance capability of a non-volatile memory device
503

Determine whether the performance capability of the non-volatile memory device is adequate to service the request
505

In response to determining that the performance capability is adequate, change a mode of operation to reduce power consumption for at least a portion of the volatile memory device and cause the non-volatile memory device to service requests of the type sent by the host device
507

FIG. 5

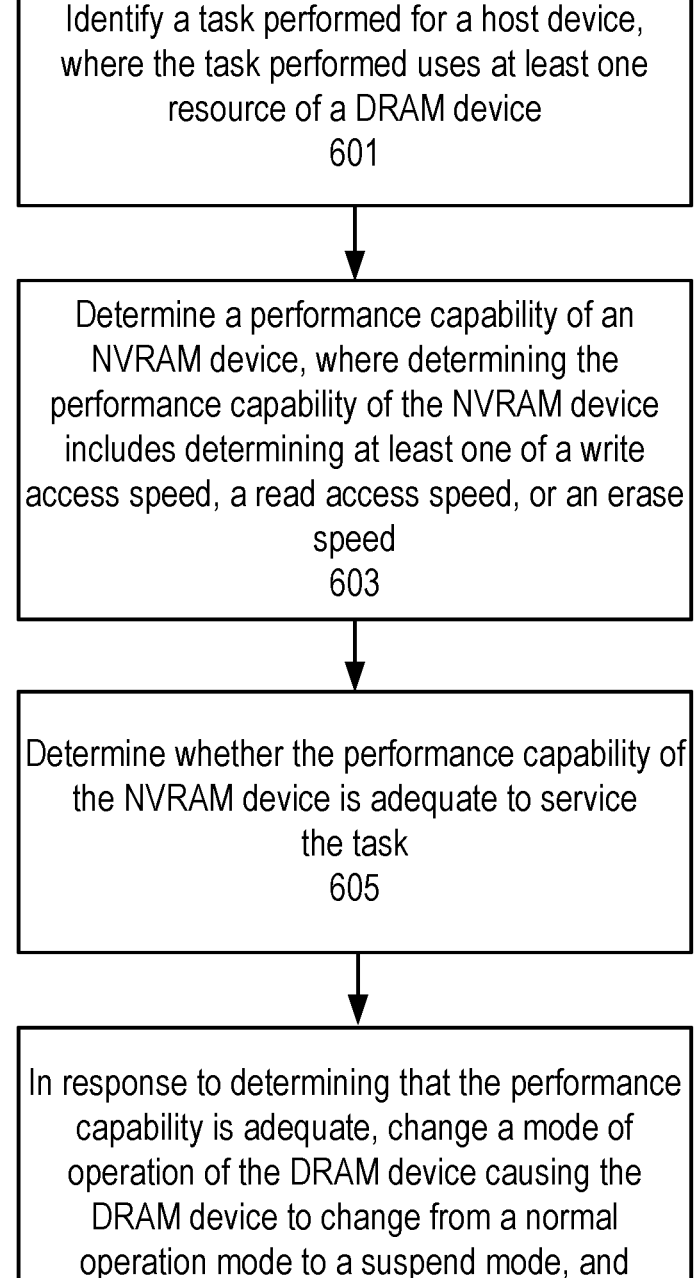

Identify a task performed for a host device, where the task performed uses at least one resource of a DRAM device
601

Determine a performance capability of an NVRAM device, where determining the performance capability of the NVRAM device includes determining at least one of a write access speed, a read access speed, or an erase speed
603

Determine whether the performance capability of the NVRAM device is adequate to service the task
605

In response to determining that the performance capability is adequate, change a mode of operation of the DRAM device causing the DRAM device to change from a normal operation mode to a suspend mode, and causing the NVRAM device to service the task
607

FIG. 6

VOLATILE MEMORY TO NON-VOLATILE MEMORY INTERFACE FOR POWER MANAGEMENT

RELATED APPLICATIONS

The present application is a continuation application of U.S. patent application Ser. No. 17/975,364, filed Oct. 27, 2022, issued as U.S. Pat. No. 11,960,738, on Apr. 16, 2024, which is a continuation application of U.S. patent application Ser. No. 17/013,415, filed Sep. 4, 2020, issued as U.S. Pat. No. 11,500,555 on Nov. 15, 2022, the entire disclosures of which applications are hereby incorporated herein by reference.

FIELD OF THE TECHNOLOGY

At least some embodiments disclosed herein relate to memory systems in general, and more particularly, but not limited to a memory system that manages an interface with a volatile memory device and a non-volatile memory device to manage memory system power.

BACKGROUND

Memory devices are widely used to store information in various electronic devices such as computers, wireless communication devices, cameras, digital displays, and the like. Information is stored by programming different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), three-dimensional cross-point, and others. Memory devices may be volatile or non-volatile. Non-volatile memory (e.g., FeRAM) may maintain their stored logic state for extended periods of time even in the absence of an external power source. Volatile memory devices (e.g., DRAM) may lose their stored state when disconnected from an external power source.

An electronic device, such as a memory device, may include one or more power domain components that it can deactivate to save power, for example, in a power down state. To provide this functionality, the electronic device may include power domain switches that may be selectively opened or closed to supply power to the power domain component from a power source. However, these power domain switches themselves use power to drive the power domain switch. In some cases, this additional power to switch may be substantial.

Memory devices are often used in computer storage devices. Typical computer storage devices have controllers that receive data access requests from host computers and perform programmed computing tasks to implement the requests in ways that may be specific to the media and structure configured in the storage devices. In one example, a flash memory controller manages data stored in flash memory and communicates with a computer device. In some cases, flash memory controllers are used in solid state drives for use in mobile devices, or in SD cards or similar media for use in digital cameras.

Firmware can be used to operate a flash memory controller for a particular storage device. In one example, when a computer system or device reads data from or writes data to a flash memory device, it communicates with the flash memory controller.

BRIEF DESCRIPTION OF THE DRAWINGS

The embodiments are illustrated by way of example and not limitation in the figures of the accompanying drawings in which like references indicate similar elements.

FIG. 5 shows a method for changing a mode of operation of a system based on output from a machine learning model, in accordance with some embodiments.

FIG. 6 shows a method for changing a mode of operation based on determining that an NVRAM device has adequate performance capability to service a task, in accordance with some embodiments.

DETAILED DESCRIPTION

Figure 1:
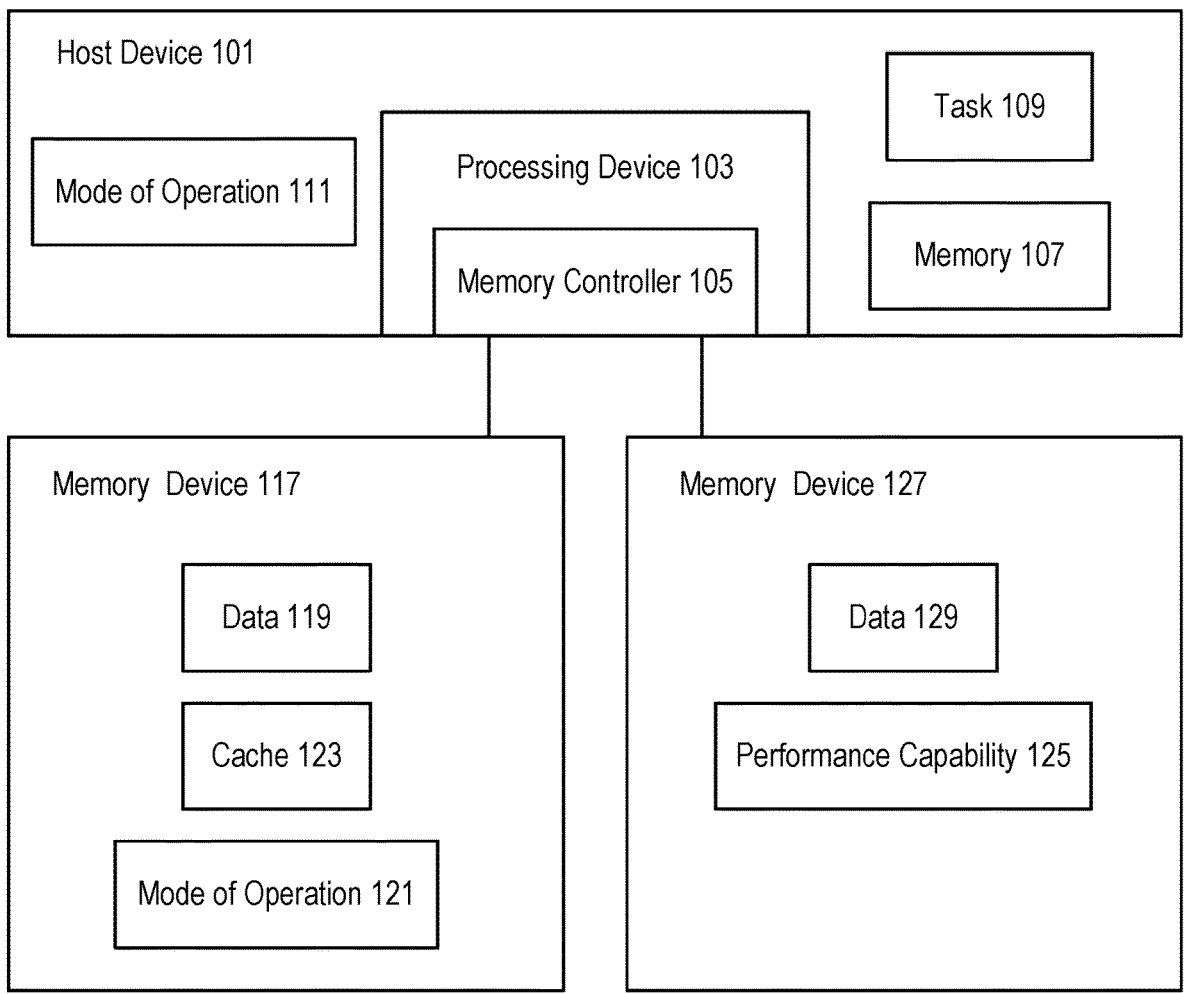
FIG. 1 illustrates a system including a host device and at least two memory devices configured to service tasks for the host device, in accordance with some embodiments.

The following disclosure describes various embodiments for a memory system that manages an interface (e.g., an interface to a host device) for a volatile memory device and a non-volatile memory device to manage memory system power. At least some embodiments herein relate to operating portions of the memory system at a reduced power level.

Memory systems in electronic devices frequently include different types of memory to meet various system performance requirements (e.g., dynamic random access memory for fast access, flash memory for non-volatile storage with medium access speed, and magnetic hard disks for high capacity storage with slow access speed). Memory devices are often kept continuously powered, even when they are not being accessed.

The memory device may, for example, store data used by a host device (e.g., a computing device of an autonomous vehicle, or another computing device that accesses data stored in the memory device). In one example, the memory device is a solid-state drive mounted in an electric vehicle.

In prior approaches, memory system components are often kept continuously powered. This may keep the memory system components ready to quickly respond to access requests from a host device, but excess power can be consumed while the memory components are idling at full power. For some applications, conserving power may be more important than maintaining peak performance from the memory system.

Various embodiments of the present disclosure address the above and other deficiencies by providing an intelligent memory system that uses power management control. In typical exemplary cases, DRAM (volatile memory) has better performance than non-volatile memory (e.g., has a faster access speed), but consumes more power (e.g., has to refresh its content frequently). In contrast, non-volatile memory (e.g., NVRAM, cross-point memory or NAND flash) is typically slower, but more power efficient.

In one embodiment, a memory controller evaluates a demand on memory performance (e.g., an access speed requirement for the DRAM as needed by an application on a host). If the demand of a current computation task needed by the host is high, the DRAM is powered-up to meet the demand (e.g., the DRAM is fully powered-up). Otherwise, if the non-volatile memory is adequate to meet the demand (e.g., slower NVRAM or NAND flash memory is sufficient to handle lighter computing tasks for the host), the DRAM memory is partially or fully-powered down to save power.

In one example, when the DRAM is powered down, a memory system runs using the non-volatile memory as necessary to support tasks for a host. In one example, only a portion of the DRAM is powered down (e.g., selected banks of the DRAM are powered down).

In one embodiment, the memory controller can vary the number of banks powered down depending on the demand on memory performance needed to service a task for a host. In one example, some of DRAM banks can be powered off, while the remaining DRAM banks can be powered up. In one example, the memory controller determines a custom mix of DRAM and non-volatile memory usage to meet the demand for servicing the host.

In one embodiment, a memory system includes a volatile memory device configured to store data for a host device, and at least one controller configured to: determine a memory performance required to service requests from the host device; and determine that the required memory performance is below a threshold (e.g., the required memory performance is less than an access speed that can be provided for servicing a task by NVRAM). In response to determining that the required memory performance is below the threshold: a mode of operation of the volatile memory device is changed to reduce power consumption for at least a portion of the volatile memory device; and a non-volatile memory device is used to service at least a portion of the requests from the host device.

In one embodiment, the threshold is a memory access speed. In one embodiment, the threshold is at least one value associated with one or more memory performance characteristics (e.g., of DRAM and/or NVRAM). The controller is further configured to select, based on the required memory performance, one or more banks of the volatile memory device for which power consumption is reduced. Changing the mode of operation includes reducing or shutting-down power for the selected banks.

In one embodiment, a volatile memory device coupled to a host device evaluates a request by a host device and determines a performance capability (e.g., read and/or write access speed) of a non-volatile memory device. The volatile memory device determines whether the non-volatile memory device has sufficient performance to service the request from the host device. Upon determining that the non-volatile memory device has sufficient performance, the request from the host device is sent to the non-volatile memory device for servicing. In one example, the volatile memory device enters a reduced power state while the non-volatile memory device is servicing the request from the host device.

Advantages provided by various embodiments described herein may include reduced memory system power consumption while still meeting system performance requirements. For example, a system (e.g., an electric vehicle) may need to update database entries (e.g., system maps, user preferences, etc.). The database updates may be non-critical and may be performed as background tasks during system idle times. Conserving system power for the electric vehicle is desired because more available power provides a greater driving range for the vehicle.

In one embodiment, a memory system includes dynamic random access memory (DRAM) and non-volatile random access memory (NVRAM). The DRAM includes a power manager (e.g., software and/or firmware) that can intelligently shut down selected banks of the DRAM based on usage patterns and/or performance requirements. For example, when the performance of memory access to a bank of the DRAM can be met by using NVRAM, the bank of the DRAM can be powered off to save energy (e.g., save energy for a mobile device or vehicle that includes the DRAM). When the memory system is idling or not performing tasks using the DRAM, the DRAM can be powered off (e.g., after flushing the cache for NVRAM and/or setting the cache for NVRAM in a write-through mode). The memory system can enter a suspend mode and/or wake up with, for example, no delay or minimum delay (e.g., less than 5-30 milliseconds).

In one embodiment, a memory system makes intelligent use of memory resources in view of power consumptions (e.g., a power consumption that is determined for DRAM and/or NVRAM). The DRAM has higher access speed and higher power consumption than the NVRAM. The memory system determines whether the performance of NVRAM is adequate for one or more current computing tasks. If so, the system chooses to downgrade memory performance in order to reduce power. The memory system implements intelligent evaluation of the memory system status or state to determine when to not use DRAM so that the DRAM can be powered off.

FIG. 1 illustrates a system including a host device 101 and two or more memory devices configured to service tasks for the host device, in accordance with some embodiments. In one embodiment, host device 101 includes processing device 103 to perform one or more tasks 109. Host device 101 may operate in various modes of operation 111. The modes of operation 111 can be configured by processing device 103. In one example, the mode of operation 111 is selected based on the task 109 to be performed.

Processing device 103 uses memory controller 105 to store data in memory devices 117 and/or 127. For example, memory controller 105 sends read and/or write commands to memory devices 117 and/or 127 to read data 119, 129, and/or to write data 119, 129 to a storage media (not shown) of memory device 117, 127.

Processing device 103 stores data in memory 107 for performing task 109. Memory 107 is, for example, DRAM. In one example, memory 107 stores data collected by one or more sensors of host device 101, memory device 117, and/or memory device 127. In one example, the sensors include a sensor to detect a level of power available to host device 101, memory device 117, and/or memory device 127. In one example, memory 107 is implemented by a device that operates the same or similarly to memory device 117.

In one embodiment, processing device 103 evaluates demand on memory system performance (e.g., memory devices 117, 127). Volatile memory (e.g., DRAM) is typically fast, but requires significant power to continuously refresh the DRAM and function at high speed. Non-volatile memory (e.g., cross-point memory or flash memory) is slower than DRAM, but is more power-efficient than DRAM. For example, cross-point memory may be ½ to $\frac{1}{10}^{th}$ the speed of DRAM, but with lower power consumption than DRAM. NAND flash memory is typically slower than both DRAM and cross-point memory (e.g., $\frac{1}{100}^{th}$ to $\frac{1}{1000}^{th}$ the speed of DRAM), but also has lower power consumption than both DRAM and cross-point memory.

In one example, the performance demand of a current computation task (e.g., task 109) is light (e.g., slower non-volatile memory performance is sufficient for servicing the task). In this example, the DRAM memory (e.g., used in a normal mode of operation) can be put into a lower-power mode to save system power. In one example, DRAM (e.g., memory device 117) may be powered-off or put into a low-power mode (e.g., self-refresh mode) to reduce DRAM power. In one example, NVRAM (e.g., memory device 127) services task 109, while memory device 117 is powered-off or in low-power mode.

In one example, the performance demand of task 109 is moderate (e.g., slower non-volatile memory performance is not sufficient). In one example, a portion of memory device 117 may be put into low-power mode, while another portion is active. In one example, memory device 117 is partially in self-refresh mode (e.g., one or more banks are in self-refresh mode, and one or more other banks are active). In this example, memory device 117 and memory device 127 can work together to service tasks from processing device 103.

In one example, the performance demand of task 109 is high. In this example, memory device 117 is put into a fully-active, high-power mode to meet the performance requirements of task 109. In one example, this high-power mode is a normal mode of operation of a memory system.

In one embodiment, processing device 103 is configured to determine a performance capability 125 of memory device 127. Based on the determined performance capability 125, processing device 103 can determine to store and/or access certain selected data on memory device 127 instead of memory device 117.

In one embodiment, certain types of data can be selected for storage on memory device 127 instead of memory device 117. In one embodiment, a mode of operation 121 of memory device 117 is determined by processing device 103. Based on this determination, processing device 103 writes/reads data to/from memory device 127 instead of memory device 117.

In one embodiment, memory device 117 includes cache 123. Cache 123 caches data for memory device 127. In one example, memory controller 105 and/or processing device 233 manages cache 123. In one example, on a cache hit, data is retrieved from memory device 117. In one example, on a cache miss, data is retrieved from memory device 127.

In one embodiment, processing device 103 identifies a task 109 that will be performed or is currently-being performed for host device 101. Performance of task 109 uses one or more resources (e.g., storage capacity and/or processing capability) of memory device 117. Processing device 103 determines performance capability 125 of memory device 127. In one example, the performance capability 125 is determined based on the task 109 being performed.

Processing device 103 determines whether performance capability 125 is adequate to service a particular task 109 (e.g., type of task). For example, processing device 103 determines whether a read access speed of memory device 127 is above a predetermined threshold associated with and/or correlated to task 109. In response to determining that the performance capability 125 is adequate, processing device 103 changes mode of operation 111 and/or 121 so that one or more resources of memory device 127 are used to service task 109.

In one example, memory device 117 is DRAM including one or more banks (not shown). In one example, changing mode of operation 121 includes shutting down one or more of the banks.

In one example, memory device 127 is NVRAM. After flushing cache 123 for the NVRAM, and/or setting cache 123 in a write-through mode, at least a portion of memory device 117 is powered off. In one example, host device 101 enters a suspend mode after the portion of memory device 117 is powered off.

In one example, a DRAM device (e.g., 117) is used as a cache for an NVRAM device (e.g., 127). With the DRAM and NVRAM both connected to host device 101 (e.g., via memory controller 105), host device 101 can manage DRAM cache 123. On a cache hit, data is retrieved from the DRAM, and on a cache miss data is retrieved from the NVRAM. In one example, in a write-through mode, data stored in cache 123 and a storage device (e.g., 127) are written together so the data in storage remains in synch with the data in cache 123. Since the storage device has the same data as the DRAM cache 123, a power reduction in the DRAM is less likely to lose data. In one example, with DRAM and NVRAM both connected to host device 101, host device 101 can signal the DRAM to power-down, and then host device 101 accesses the NVRAM directly.

In one example, a power manager (e.g., software or firmware) is implemented by processing device 103. The power manager controls power consumption (e.g., by configuring use of resources) by memory device 117 and memory device 127. The power manager increases or decreases power to memory device 117 and/or memory device 127 in response to determining performance capability 125 and/or other operating characteristics of either device 117 and/or 127. In one example, power is increased or decreased in response to comparing a performance capability and/or operating characteristic to one or more types of tasks 109 to be performed. In one example, the power manager uses one or more outputs from one or more machine learning models to make decisions regarding power control.

Figure 2:
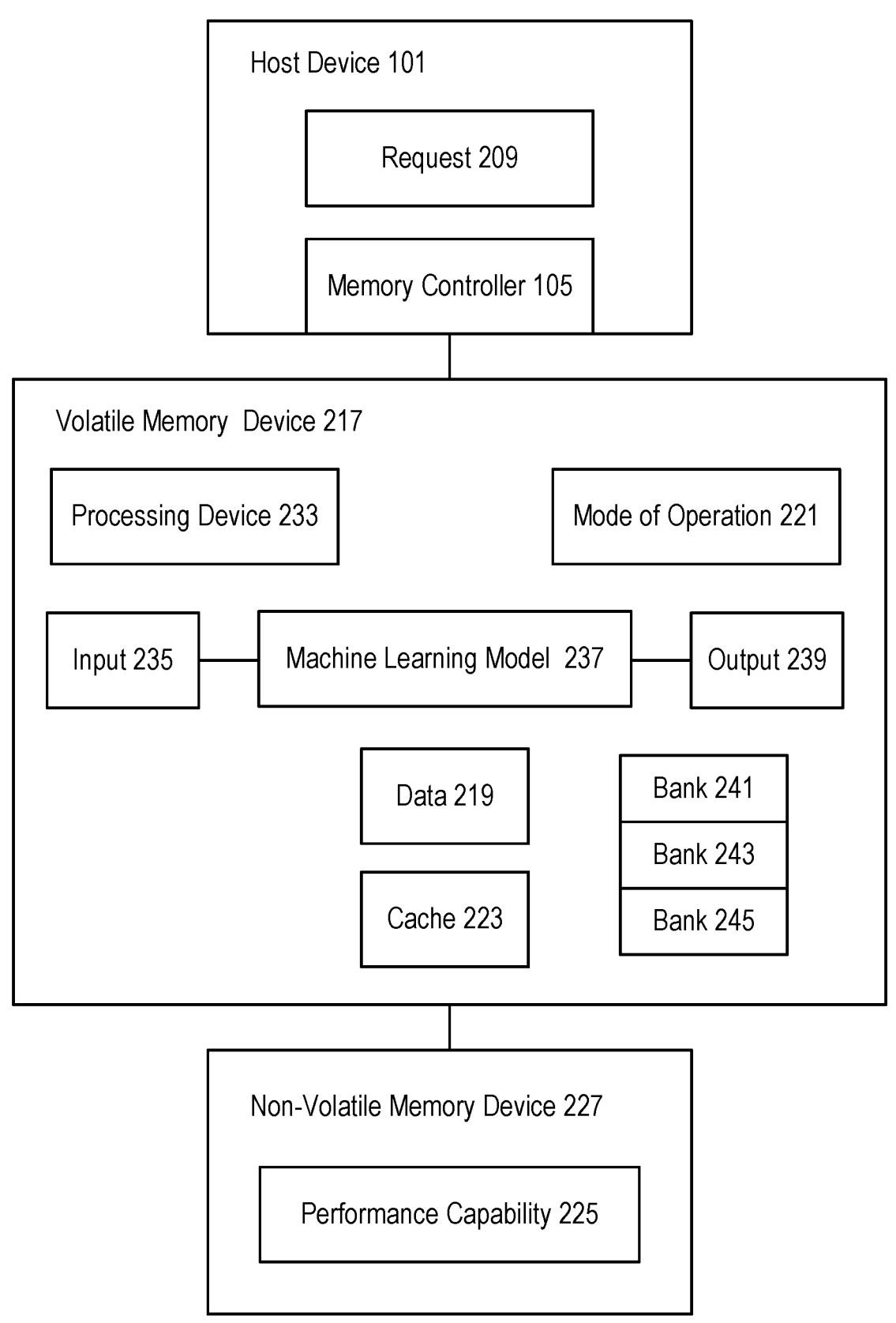
FIG. 2 illustrates a system including a host device, a volatile memory device, and a non-volatile memory device configured to service tasks for the host device, in accordance with some embodiments.

FIG. 2 illustrates a system including host device 101. A volatile memory device 217 (e.g., DRAM) and a non-volatile memory device 227 (e.g., NVRAM) are configured to service tasks for host device 101, in accordance with some embodiments. In one example, the task to be serviced is request 209. Host device 101 is configured to send one or more requests 209 to volatile memory device 217 using memory controller 105. For example, requests 209 includes read requests and/or write requests.

Volatile memory device 217 includes processing device 233, which services requests 209 received from host device 101 (e.g., commands received over a serial interface). Volatile memory device 217 is configured to operate in various modes of operation 221 as controlled by processing device 233.

Volatile memory device 217 includes a machine learning model 237 implemented by processing device 233 using inputs 235. An output 239 of machine learning model 237 is used by processing device 233 to make decisions regarding intelligent selection of various modes of operation 221.

Inputs 235 include, for example, data received from memory controller 105. Inputs 235 further include, for example, data collected by one or more sensors of host device 101, volatile memory device 217, and/or non-volatile memory device 227. In one example, input 235 includes the type of request 209 received from host device 101.

In one example, inputs 235 include operating characteristics of non-volatile memory device 227. In one example, the operating characteristics are based on a history of operation for non-volatile memory device 227 in handling previously-stored data.

In one example, inputs 235 can include an address of an access request. Machine learning model 237 can be trained on prior data to learn which addresses are associated with an access that is too slow (e.g., below a predetermined threshold). When a future access request associated with the address is received, the address is serviced using DRAM instead of NVRAM. In one example, machine learning model 237 learns over time addresses that correlate with applications of host device 101 that require faster performance.

In one embodiment, processing device 233 determines a performance capability 225 of non-volatile memory device 227. In one example, performance capability 225 is determined based on output 239 of machine learning model 237.

Volatile memory device 217 stores data 219 for host device 101. In one example, data 219 is stored in one or more banks 241, 243, 245. Volatile memory device 217 also includes cache 223 configured to cache data obtained from non-volatile memory device 227.

In one embodiment, processing device 233 changes mode of operation 221 based on output 239. In one example, the changed mode of operation 221 reduces power consumption by volatile memory device 217.

In one embodiment, processing device 233 identifies a type of request received from host device 101, and determines performance capability 225. Processing device 233 determines whether performance capability 225 is adequate to service the type of request received. For example, the type of request can be a write access. For example, the type of request can relate to critical or sensitive data used by host device 101. In one example, resources associated with performance capability 225 are evaluated to determine whether the type of request can be adequately serviced. In one example, adequate service is determined based on whether a performance characteristic for a function (e.g., a read access speed) exceeds a predetermined threshold.

In response to determining that performance capability 225 is adequate for request 209, processing device 233 changes mode of operation 221. In one example, the changed mode of operation reduces power consumption for one or more portions of volatile memory device 217. In one example, bank 241 and/or 243 are selected for powering off.

Also, in response to determining that performance capability 225 is adequate, processing device 233 additionally and/or alternatively causes non-volatile memory device 227 to service request 209 and/or other requests of the type sent by host device 101. In one example, processing device 233 signals a controller (not shown) of non-volatile memory device 227 to service the request.

In one example, a DRAM is connected to a memory controller (e.g., 105) on one side and NVRAM on the other side such that the NVRAM is downstream from the DRAM. In this case, a DRAM power manager (e.g., software implemented by processing device 233 using machine learning model 237) can provide intelligence by evaluating incoming requests and deciding if the requests can be fulfilled by the NVRAM, or require use of the DRAM. The DRAM power manager determines those requests that need DRAM performance, as contrasted to those requests that can be satisfied with NVRAM performance. In one example, data received from memory controller 105 can be used as an input 235 for making this determination. In one example, processing device 233 receives feedback data from memory controller 105 for previously-executed requests 209. The feedback data is used by the power manager to determine whether new tasks should be executed using DRAM or NVRAM.

Figure 3:
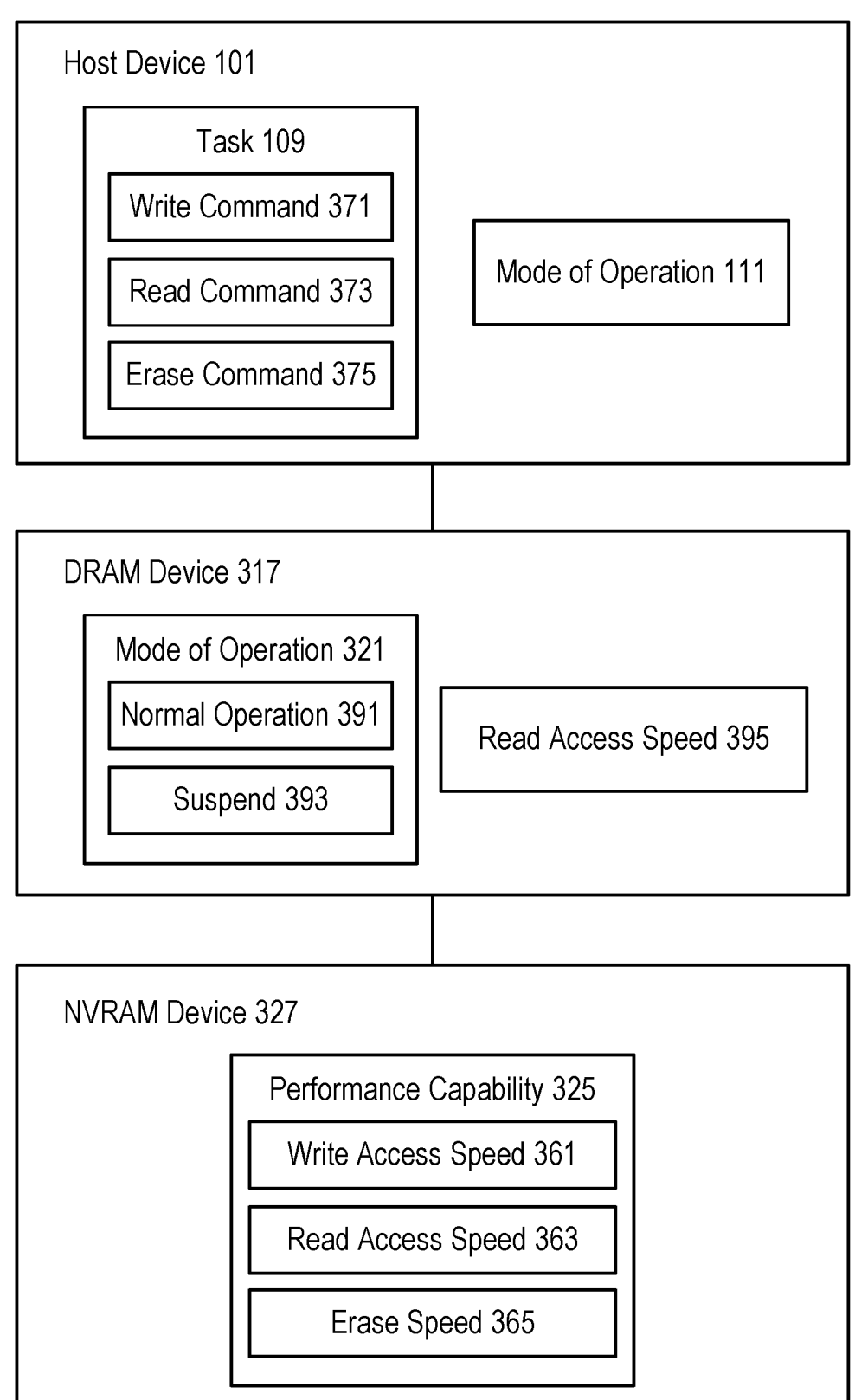
FIG. 3 illustrates a system including a host device, a DRAM device coupled to the host device, and an NVRAM device coupled to the DRAM device. The DRAM and NVRAM devices are configured to service tasks for the host device, in accordance with some embodiments.

FIG. 3 illustrates a system including a host device 101 (e.g., host device 101 as discussed for FIG. 1). A DRAM device 317 is coupled (e.g., via a memory or communication bus) to host device 101, and an NVRAM device 327 is coupled to DRAM device 317 (e.g., via a communication bus). Host device 101 operates in various modes of operation 111 (e.g., mode of operation 111 as discussed for FIG. 1).

DRAM device 317 and NVRAM device 327 are configured to service tasks for host device 101, in accordance with some embodiments. In one example, the tasks include task 109. Task 109 can be, for example, a write command 371, a read command 373, and/or an erase command 375.

DRAM device 317 operates in various modes of operation 321, which include a normal operation mode 391 and a suspend mode 393. The performance of DRAM device 317 is characterized by, for example, a read access speed 395. A processing device of host device 101 and/or DRAM device 317 can determine read access speed 395 when assessing operating characteristic(s) of DRAM device 317.

NVRAM device 327 is characterized by a performance capability 325, which can include a write access speed 361, read access speed 363, and/or an erase speed 365. Performance capability 325 can be determined by host device 101 and/or DRAM device 317 when determining whether to service one or more tasks 109 using NVRAM device 327.

In one example, read access speed 363 is compared to read access speed 395, and/or read access speed 363 is compared to a required performance threshold for a task. Based on this comparison(s), a determination is made to change mode of operation 111 and/or mode of operation 321. In one example, mode of operation 321 is changed to suspend mode 393, and task(s) 109 are serviced by NVRAM device 327.

In one example, read access speed 395 is greater than read access speed 363. However, it is determined that read access speed 363 is adequate to service task 109. In response to this determination, NVRAM device 327 executes read command 373 for host device 101.

In one embodiment, after DRAM device 317 enters suspend mode 393, host device 101 sends memory access commands to NVRAM device 327. In one example, the commands are passed through DRAM device 317 to NVRAM device 327 (e.g., using a pass-through channel (not shown)). For example, while in suspend mode 393, one or more banks (not shown) of DRAM device 317 are powered off. A controller (not shown) of DRAM device 317 remains powered on and receives the memory access commands from host device 101, and in response to receiving these commands, sends the commands to a controller (not shown) of NVRAM device 327.

In one example, NVRAM device 327 is connected in series with DRAM device 317, and most of the DRAM is shut down (e.g., one or all DRAM banks enter a suspend mode). The DRAM device 317 has a pass-through mode of operation 321 in which selected or all requests (e.g., tasks 109 or requests 209) from host device 101 use a bypass path through the DRAM to the NVRAM.

In one example, the DRAM is built into the NVRAM device specifically to act as a dedicated cache for the NVRAM device. A controller (not shown) in the NVRAM device takes incoming requests from host device 101, checks the DRAM cache (e.g., cache 223), and retrieves data for host device 101 from the DRAM on a cache hit, or from the NVRAM on a cache miss. In some cases, the NVRAM device includes one or more internal DRAM caches to improve performance. In these cases, power can be saved by knowing when the cache is needed, or when native NVRAM performance is acceptable.

Figure 4:
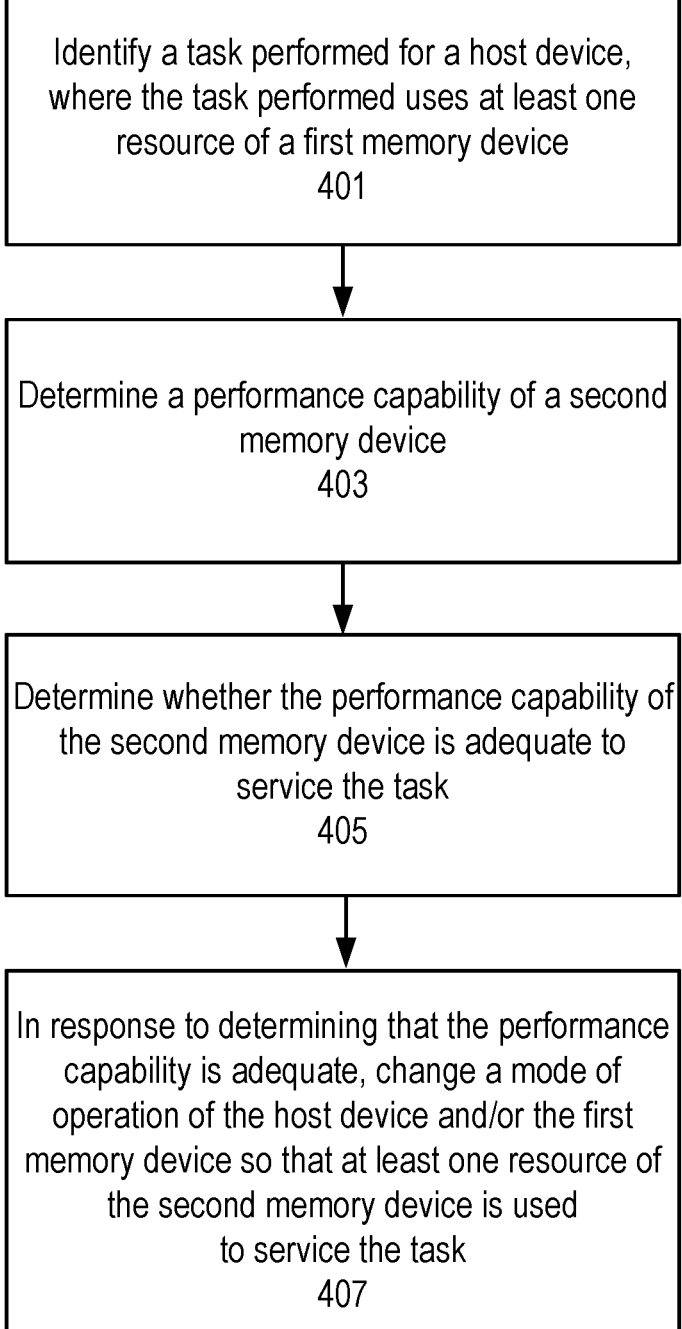
FIG. 4 shows a method for changing a mode of operation of a system based on determining whether a memory device has adequate performance capability to service a task, in accordance with some embodiments.

FIG. 4 shows a method for changing a mode of operation of a system based on determining whether a memory device has adequate performance capability to service a task, in accordance with some embodiments. For example, the method of FIG. 4 can be implemented in the system of FIG. 1. In one example, performance capability 125 of memory device 127 is determined by host device 101 or memory device 117. In one example, the task is task 109 or request 209.

The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by one or more processing devices (e.g., processing device 103 and/or memory controller 105 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 401, a task performed (e.g., currently performed or to be performed I the future) for a host device is identified. The task uses one or more resources of a first memory device. In one example, the task uses memory device 117 when in a normal mode of operation.

At block 403, a performance capability of a second memory device is determined. In one example, the performance capability is an erase speed or a write speed. In one example, the second memory device is memory device 127.

At block 405, a determination is made whether the performance capability of the second memory device is adequate to service the task. In one example, performance capability 125 is evaluated to determine whether the task can be performed with sufficient speed of access and/or the evaluation is based on other operating requirements. In one example, an operating requirement of an application of host device 101 is used as part of this evaluation.

At block 407, in response to determining that the performance capability is adequate, a mode of operation of the host device and/or the first memory device is changed so that at least one resource of the second memory device is used to service the task. In one example, mode of operation 111 is changed so that host device 101 sends memory access request to memory device 127. In one example, mode of operation 121 of memory device 117 is changed to enter a standby or suspend mode.

FIG. 5 shows a method for changing a mode of operation of a system based on output from a machine learning model, in accordance with some embodiments. For example, the method of FIG. 5 can be implemented in the system of FIG. 2. In one example, the machine learning model is machine learning model 237.

The method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 is performed at least in part by one or more processing devices (e.g., processing device 233 of FIG. 2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 501, based on an output from a machine learning model, a type of request received by a volatile memory device from a host device is identified. In one example, the request is request 209 received by volatile memory device 217.

At block 503, a performance capability of a non-volatile memory device is determined. In one example, the performance capability is performance capability 125 or 225.

At block 505, a determination is made whether the performance capability of the non-volatile memory device is adequate to service the request. In one example, the non-volatile memory device is non-volatile memory device 227.

At block 507, in response to determining that the performance capability is adequate, a mode of operation is changed to reduce power consumption for at least a portion of the volatile memory device, and to cause the non-volatile memory device to service requests of the type sent by the host device. In one example, the mode of operation 221 is changed to a suspend mode 393.

FIG. 6 shows a method for changing a mode of operation based on determining that an NVRAM device has adequate performance capability to service a task, in accordance with some embodiments. For example, the method of FIG. 6 can be implemented in the system of FIG. 3. In one example, the NVRAM device is NVRAM device 327, and the task is task 109.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices (e.g., a controller (not shown) of DRAM device 317 in FIG. 3).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, a task performed for a host device is identified. The task uses one or more resources of a DRAM device (e.g., in a normal operation mode). In one example, the resources include memory storage capacity, processing power, and/or available energy (e.g., battery power).

At block 603, a performance capability of NVRAM device is determined. This determination includes determining one or more of a write access speed, a read access speed, and/or an erase speed. In one example, the write access speed is write access speed 361, and the erase speed is erase speed 365.

At block 605, a determination is made whether the performance capability of the NVRAM device is adequate to service the task. In one example, the performance capability is performance capability 125, 225, or 325.

At block 607, in response to determining that the performance capability is adequate, a mode of operation of the DRAM device is changed to cause the DRAM device to change from a normal operation mode to a suspend mode, and further in response to the determination, causing the NVRAM device to service the task (e.g., instead of servicing the task using the DRAM device). In one example, the normal operation mode is normal operation mode 391, and the suspend mode is suspend mode 393.

In one embodiment, a system includes: a volatile memory device (e.g., 117, 217, 317) configured to store data for a host device (e.g., 101); and at least one processing device configured to: identify a type of request received from the host device; determine a performance capability of a non-volatile memory device (e.g., 127, 227, 327); determine whether the performance capability of the non-volatile memory device is adequate to service the type of request; and in response to determining that the performance capability is adequate, change a mode of operation (e.g., 111, 121, 221, and/or 321) to reduce power consumption for at least a portion of the volatile memory device, and cause the non-volatile memory device to service requests of the type sent by the host device.

In one embodiment, changing the mode of operation includes reducing or shutting-down power to one or more portions of the volatile memory device.

In one embodiment, the at least one processing device includes a controller to execute power management that manages power consumption for portions of the volatile memory device.

In one embodiment, the system further includes: a cache (e.g., 123, 223) for caching data for the non-volatile memory device; where the at least one processing device is further configured to, prior to reducing the power consumption for the portion of the volatile memory device, flush the cache to the non-volatile memory device, or set the cache for the non-volatile memory device in a write-through mode.

In one embodiment, identifying the type of request is based on an output from a machine learning model (e.g., 237) having an input including at least one of a memory access address, an operating characteristic of the non-volatile memory device, an operating characteristic of the volatile memory device, or an operating characteristic of the host device.

In one embodiment, the at least one processing device is further configured to: evaluate incoming requests from the host device; where determining whether the performance capability of the non-volatile memory device is adequate includes determining, based on the evaluation of the incoming requests, that the performance capability is adequate.

In one embodiment, a memory controller of the host device is configured to monitor performance of the non-volatile memory device in servicing requests from the host device, and to signal the at least one processing device based on the monitoring; and determining whether the performance capability of the non-volatile memory device is adequate includes determining, based on signaling by the memory controller, that the performance capability is adequate.

In one embodiment, a system includes: at least one processing device of a host device; and memory containing instructions configured to instruct the at least one processing device to: identify a task (e.g., task 109, request 209) performed for the host device, the task performed using at least one resource of a first memory device; determine a performance capability of a second memory device coupled to service the task for the host device; determine whether the performance capability of the second memory device is adequate to service the task; and in response to determining that the performance capability is adequate: change a mode of operation of the host device so that at least one resource of the second memory device is used to service the task, and reduce power consumption for at least one portion of the first memory device.

In one embodiment, the at least one processing device includes a memory controller configured to signal, over a communication bus (e.g., a serial bus), the first memory device and the second memory device; and reducing the power consumption includes signaling, by the memory controller, the first memory device to reduce power consumption of one or more banks of the first memory device.

In one embodiment, the at least one processing device includes a memory controller configured to store data for the host device in the first memory device and the second memory device. The first memory device includes a cache for caching data for the second memory device, the memory controller is further configured to manage the cache, and the memory controller is further configured to: on a cache hit, retrieve data from the first memory device; and on a cache miss, retrieve data from the second memory device.

In one embodiment, the first memory device and the second memory device are non-volatile memory, and a write speed of the first memory device is greater than a write speed of the second memory device.

In one embodiment, the at least one resource of the first memory device includes at least one of processing capability, memory storage capability, available type of storage media, available mode of storage, access speed of storage media, or remaining power available from a power supply.

In one embodiment, a method includes: identifying a task performed for a host device, the task performed using at least one resource of a first memory device; determining a performance capability of a second memory device; determining whether the performance capability of the second memory device is adequate to service the task; and in response to determining that the performance capability is adequate, changing a mode of operation of at least one of the host device or the first memory device so that at least one resource of the second memory device is used to service the task.

In one embodiment, changing the mode of operation includes reducing power consumption for at least a portion of the first memory device.

In one embodiment, a read access speed of the first memory device is greater than a read access speed of the second memory device.

In one embodiment, the first memory device is a dynamic random access memory (DRAM) device.

In one embodiment, the second memory device is a non-volatile random access memory (NVRAM) device.

In one embodiment, the task performed for the host device is executing a write command, a read command, or an erase command.

In one embodiment, determining the performance capability of the second memory device includes determining at least one of a write access speed, a read access speed, or an erase speed.

In one embodiment, changing the mode of operation includes: sending, by the host device, a command to the first memory device causing the first memory device to enter an operating state that reduces power consumption; and sending memory access commands of the host device to the second memory device.

In one embodiment, causing the first memory device to enter the operating state includes instructing the first memory device to perform at least one of: reducing a clock frequency used by the first memory device, gating a clock signal used by the first memory device, or reducing power to at least one portion of the first memory device.

In one embodiment, sending the memory access commands of the host device to the second memory device includes: receiving, by the first memory device, the memory access commands from the host device; and in response to receiving the memory access commands, sending, by the first memory device, the memory access commands to the second memory device.

In one embodiment, changing the mode of operation includes causing the first memory device to change from a normal operation mode to a suspend mode.

In one embodiment, the first memory device is configured to change from the suspend mode to the normal operation mode in response to a signal from the host device.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
at least one processing device; and
memory containing instructions configured to instruct the at least one processing device to:
identify a type of request for a memory device;
determine, based on the type, a performance capability of the memory device to service the request; and
in response to determining the performance capability, change a mode of operation for selected portions of the memory device.

2. The system of claim 1, wherein the portions are selected based on a required memory performance.

3. The system of claim 1, wherein changing the mode of operation comprises reducing power for a volatile memory device.

4. The system of claim 1, wherein changing the mode of operation comprises changing from a normal operation mode to a suspend mode.

5. The system of claim 1, wherein the request is a write access.

6. The system of claim 1, wherein determining the performance capability comprises determining whether a read access speed exceeds a threshold.

7. A system comprising:
a non-volatile memory device;
a machine learning model configured to provide an output using an operating characteristic of the non-volatile memory device as an input; and
memory configured to control operation based on the output.

8. The system of claim 7, wherein the machine learning model uses a memory access address as a further input.

9. The system of claim 7, wherein the machine learning model is trained to learn memory access addresses associated with reduced access speed.

10. The system of claim 7, further comprising at least one controller configured to select, based on the output, a type of memory to service an access request.

11. The system of claim 7, wherein the machine learning model is configured in a volatile memory device, and the machine learning model uses an operating characteristic of the volatile memory device as a further input.

12. The system of claim 7, wherein the memory is further configured to store data for a host device, and the machine learning model uses an operating characteristic of the host device as a further input.

13. The system of claim 7, wherein controlling operation comprises controlling power consumption.

14. The system of claim 7, wherein controlling operation comprises changing operation for at least one selected portion of the memory.

15. A system comprising:

at least one sensor;

a cache configured to receive first data from a non-volatile memory device; and a plurality of banks of a volatile memory device configured to store second data using a mode of operation based on data from the sensor.

16. The system of claim 15, wherein the data from the sensor is used to select the banks.

17. The system of claim 15, further comprising at least one controller configured to select either the first or second data for providing to a host device in response to a read request.

18. The system of claim 17, wherein the sensor is located in the host device.

19. The system of claim 15, wherein the sensor is located in the non-volatile memory device.

20. The system of claim 15, wherein the sensor is located in the volatile memory device.

21. The system of claim 1, wherein the request for the memory device is received from a host device connected to the system.

22. The system of claim 1, wherein the type of request comprises an indication of at least one of:

the request being a read or write request, or the request being related to critical or sensitive data used by a host device connected to the system.

* * * * *